Jan. 8, 1957 R. WADDELL 2,776,680
GUIDE FOR RECIPROCATING SAW
Filed Dec. 30, 1954
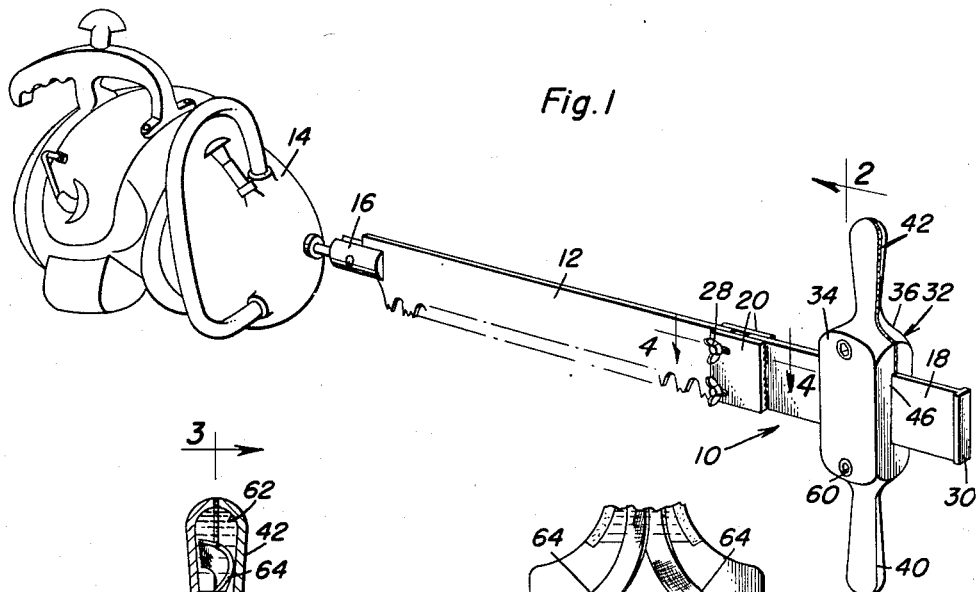
Roy Waddell
INVENTOR.

United States Patent Office 2,776,680
Patented Jan. 8, 1957

2,776,680
GUIDE FOR RECIPROCATING SAW
Roy Waddell, North Creek, N. Y.
Application December 30, 1954, Serial No. 478,603
2 Claims. (Cl. 143—163)

This invention generally relates to a guide device and more specifically provides a guide for reciprocating saws of the power type for steadying and guiding the outer or free end of a reciprocating saw.

An object of this invention is to provide a guide for a reciprocating saw including an extension on the end of the saw blade that is slidably received in a bearing housing having handles thereon wherein the saw may be guided and supported at the outer end thereof for facilitating the operation of the reciprocating saw and specifically improving the control thereof.

Another object of the present invention is to provide a reciprocating power saw guide that is lubricated and provided with bearing means receiving an extension on the saw blade thereby eliminating the necessity of a backing member for the saw blade and eliminating the lubrication problem of the saw as it slides in such a backing member.

Yet another important object of the present invention is to provide a reciprocating saw guide having handles thereon together with bearing means for engaging an extension on the saw blade for controlling and manipulating the saw blade in an efficient and effective manner.

Still another important feature of the present invention is to provide a guide for reciprocating power saws that is simple in construction, efficient in use, easy to attach to existing saw blades, well adapted for its intended purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing a reciprocating power saw with the saw guide of the present invention positioned thereon;

Figure 2 is a vertical, sectional view taken substantially upon a plane passing along section line 2—2 of Figure 1 showing the internal structure of the saw guide and the ball bearings positioned for engaging the sides of the extension plate and the rollers engaging the top and bottom thereof;

Figure 3 is a vertical, sectional view taken substantially upon a plane passing along section line 3—3 of Figure 2, showing the relationship of the rollers and the ball members positioned within the saw guide of the present invention; and Figure 4 is a plan, sectional view, taken substantially upon a plane passing along section line 4—4 of Figure 1, showing the manner of attaching the extension plate or guide plate to the outer or free end of the reciprocating saw blade.

Referring now specifically to the drawings, it will be seen that the numeral 10 generally designates the guide of the present invention for attachment to a reciprocating blade 12 driven by a suitable motor 14 together with a connecting member 16 for securing the blade 12 to the motor 14. The details of the motor 14, the blade 12 and the connector 16 are the same as that illustrated in my copending application, Serial No. 380,521, filed September 16, 1953, for Reciprocating Saw, issued March 20, 1956, as Patent No. 2,738,812.

The guide 10 generally includes an elongated extension or guide plate 18 of substantially the same cross-sectional area as the saw blade 12, and the inner end of the plate 18 is provided with an attaching plate 20 on each side thereof and secured thereto by suitable welding 22. The attaching plates 20 project beyond the end of the extension plate 18 in spaced parallel relation, and each of the plates 20 is provided with a pair of vertically spaced and aligned horizontally elongated slots 24 for receiving fastening bolts 26 having wing nuts 28 thereon for quickly and easily securing the extension plate 18 to the saw blade 12 in a rigid manner. Normally, the extension plate 18 forms a longitudinal extension of the saw blade 12 and is of substantially the same cross-sectional area. The outer end of the extension plate 18 is provided with an abutment or stop means in the form of an enlargement 30, and it will be seen that the shoulders formed by the attaching plates 20 form an inner stop member or abutment, thereby forming a guide plate for receiving a carrier or holder generally designated by the numeral 32.

The carrier or holder 32 generally includes a pair of members 34 and 36 with a centrally disposed enlarged portion 38 and handle forming portions 40 and 42 extending from the upper and lower end thereof. The central portions 38 of the members 34 and 36 are provided with centrally disposed recesses 44 that terminate in recessed areas 46 at each edge thereof for receiving the extension plate 18. For guiding the movement of the extension plate 18, each of the recesses 44 in the central portions 38 of the members 34 and 36 is provided with a pair of vertically extending semi-cylindrical members 48 which extend substantially more than 180° for receiving a plurality of vertically disposed ball bearings 50 which are disposed therein. The semi-cylindrical members 48 extend slightly more than one-half of the circumference of the ball bearing members 50, thereby forming a cage for the ball bearing members 50 which engages the side surfaces of the extension plate 18. It will be seen that a pair of semi-cylindrical members 48 or cages are provided in each recess 44 and in opposed alignment so that the ball bearings 50 will guide and support the extension plate 18 when it is moved relative to the holder 30. Engaging the upper and lower edges of the extension plate 18 is a pair of rollers 52 positioned on a shaft 54 and provided with suitable bearings 56. It is noted that a pair of these rollers are provided on each edge of the extension plate 18 and the mounting rod 54 extends between the members 34 and 36 and is disposed in a recessed area 58. The two members 34 and 36 are held together by suitable fastening bolts 60 and the handle portion 42 is recessed, as indicated by the numeral 62, and provided with wick members 64 which extend into the recessed area 58 for dispensing lubrication to the rollers 52 and to the extension plate 18. If desirable, suitable means may be provided for admitting lubrication into the recess 62 or the device may be initially packed with a suitable lubricant and the supply need only be replenished at infrequent intervals.

In operation, the handle portions 40 and 42 are grasped by a person while another person utilized the handles on the motor 14, and by coordinated movement, the saw blade 12 may be manipulated and controlled in a most efficient manner. This permits the use of the saw in various planes and steadies the saw blade 12 so that it will not vibrate or bind, which may occur without the use of a guide including the plate 18 and the holder or carrier 32. The stop member 30, as well as the shoulders of the attaching plates 20 limit the movement between the carrier 32 and the extension plate 18, thereby assuring that the carrier 32 will be positioned in substantially the correct position at all times.

While one form of the invention has been illustrated for the purposes of description, it will be understood that various modifications may be made to the carrier 32 wherein other types of bearing mechanism may be utilized, such as vertically disposed roller bearings, plate-like bushing bearings or any other type of bearing and other types of lubrication means may be provided. Further, the handle portions 40 and 42 may be detachable for positioning in the relation as set forth in Figure 1 or positioning on the sides of the members 34 and 36 so that the blade 12 may be easily manipulated in any direction. Further, while the device has been illustrated for use on one type of reciprocating saw blade, it will be readily understood that the guide of the present invention may be utilized on any type of reciprocating saw where it is desirable to accurately control and support the saw blade without contaminating the wood with lubrication and without causing binding and other troubles due to the use of a stiffening backing member in which the saw blade 12 normally rides.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A guide for the free end of a self-sustaining reciprocating flat saw blade comprising a longitudinal extension rigidly attached to the free end of the saw blade, a holder having a bore extending therethrough slidably receiving said extension, oppositely projecting handles on said holder, one of said handles forming a lubrication reservoir, bearing means on the peripheral surface of the bore for engaging the peripheral surface of the extension, and a wick communicating the oil reservoir with the bearing means.

2. A guide for the free end of a self-sustaining reciprocating flat saw blade comprising a longitudinal extension rigidly attached to the free end of the saw blade, a holder having a bore extending therethrough slidably receiving said extension, oppositely projecting handles on said holder, one of said handles forming a lubrication reservoir, bearing means on the peripheral surface of the bore for engaging the peripheral surface of the extension, and a wick communicating the oil reservoir with the bearing means, said extension and bore being substantially the same shape as the saw blade, a plate interconnecting the blade and extension, an enlarged free end on the extension, said plate and enlarged free end forming stop abutments for retaining the holder on the extension, said bearing means including a plurality of ball members at each end and each side of said bore and a roller at each end and top and bottom of the bore thereby engaging the periphery of the extension at longitudinally spaced points for stabilizing the extension and saw blade.

References Cited in the file of this patent

UNITED STATES PATENTS

| 319,624 | Rodebaugh | June 9, 1885 |
| 446,127 | Wright | Feb. 10, 1891 |
| 884,744 | Libby et al. | Apr. 14, 1908 |
| 986,450 | Francisco | Mar. 14, 1911 |
| 1,734,212 | Johnston | Nov. 5, 1929 |

FOREIGN PATENTS

| 512,611 | Great Britain | Sept. 21, 1939 |